(12) United States Patent
Chapuis

(10) Patent No.: US 7,315,156 B2
(45) Date of Patent: *Jan. 1, 2008

(54) SYSTEM AND METHOD FOR CONTROLLING OUTPUT-TIMING PARAMETERS OF POWER CONVERTERS

(75) Inventor: Alain Chapuis, Morgan Hill, CA (US)

(73) Assignee: Power-One, Inc., Camarillo, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 11/264,057

(22) Filed: Oct. 31, 2005

(65) Prior Publication Data

US 2006/0061214 A1  Mar. 23, 2006

Related U.S. Application Data

(63) Continuation of application No. 11/103,835, filed on Apr. 11, 2005, now Pat. No. 7,068,021, which is a continuation of application No. 10/388,831, filed on Mar. 14, 2003, now Pat. No. 6,936,999.

(51) Int. Cl.
*G05F 1/40* (2006.01)

(52) U.S. Cl. .................................................. 323/282

(58) Field of Classification Search ................ 323/282, 323/318, 351; 714/22
See application file for complete search history.

(56) References Cited

U.S. PATENT DOCUMENTS 429,581 A    6/1890   Tan (Continued)

FOREIGN PATENT DOCUMENTS

| EP | 315366  | 5/1989  |
|----|---------|---------|
| EP | 0660487 | 6/1995  |
| EP | 0875994 | 11/1998 |
| EP | 0997825 | 5/2000  |
| RU | 1814177 | 5/1993  |

(Continued)

OTHER PUBLICATIONS

"Distributed Intelligence and Modular Architecture for Next Generation DC Power System" by Louis Duguay and Pierre Got Astec Advanced Power Systems, Quebec, Canada; 6 pgs.

(Continued)

*Primary Examiner*—Adolf Berhane
(74) *Attorney, Agent, or Firm*—O'Melveny & Myers LLP

(57) ABSTRACT

A system and method is provided for utilizing output-timing data to control at least one output timing parameter of a point-of-load ("POL") regulator. Specifically, a power supply controller ("controller") is adapted to transmit output-timing data to at least one POL regulator. In one embodiment of the present invention, each POL regulator includes an output builder, a control unit and a storage device. The control unit is adapted to store the output-timing data in the storage device. The control unit and the output builder are then adapted to produce an output having at least one output timing parameter in accordance with the output-timing data. Examples of output-timing data include sequencing data, turn-on data, turn-off data, termination data, slew-rate data, etc. For example, a POL regulator may be adapted to utilize output-timing data, or a portion thereof (e.g., slew-rate data), to generate an output having a particular slew rate. Similarly, a POL regulator may be adapted to utilize output-timing data, or a portion thereof (e.g., sequencing data, turn-on data, etc.), to determine (or calculate) a period of time to wait (e.g., delay period) before the output is generated. In other words, output-timing data can be used to produce a series of outputs in a particular order, or sequence.

18 Claims, 3 Drawing Sheets

U.S. PATENT DOCUMENTS

| | | | |
|---|---|---|---|
| 3,660,672 A | 5/1972 | Berger et al. |
| 4,194,147 A | 3/1980 | Payne et al. |
| 4,204,249 A | 5/1980 | Dye et al. |
| 4,335,445 A | 6/1982 | Nercessian |
| 4,451,773 A | 5/1984 | Papathomas et al. |
| 4,538,073 A | 8/1985 | Freige et al. |
| 4,538,101 A | 8/1985 | Shimpo et al. |
| 4,616,142 A | 10/1986 | Upadhyay et al. |
| 4,622,627 A | 11/1986 | Rodriguez et al. |
| 4,654,769 A | 3/1987 | Middlebrook |
| 4,677,566 A | 6/1987 | Whittaker et al. |
| 4,940,930 A | 7/1990 | Detweiler |
| 5,004,972 A | 4/1991 | Roth |
| 5,053,920 A | 10/1991 | Staffiere et al. |
| 5,073,848 A | 12/1991 | Steigerwald et al. |
| 5,079,498 A | 1/1992 | Cleasby et al. |
| 5,117,430 A | 5/1992 | Berglund |
| 5,229,699 A | 7/1993 | Chu et al. |
| 5,270,904 A | 12/1993 | Gulczynski |
| 5,272,614 A | 12/1993 | Brunk et al. |
| 5,349,523 A | 9/1994 | Inou et al. |
| 5,377,090 A | 12/1994 | Steigerwald |
| 5,481,140 A | 1/1996 | Maruyama et al. |
| 5,532,577 A | 7/1996 | Doluca |
| 5,627,460 A | 5/1997 | Bazinet et al. |
| 5,631,550 A | 5/1997 | Castro et al. |
| 5,646,509 A | 7/1997 | Berglund et al. |
| 5,675,480 A | 10/1997 | Stanford |
| 5,727,208 A | 3/1998 | Brown |
| 5,752,047 A | 5/1998 | Darty et al. |
| 5,815,018 A | 9/1998 | Soborski |
| 5,847,950 A | 12/1998 | Bhagwat |
| 5,870,296 A | 2/1999 | Schaffer |
| 5,872,984 A | 2/1999 | Berglund et al. |
| 5,874,912 A | 2/1999 | Hasegawa |
| 5,883,797 A | 3/1999 | Amaro et al. |
| 5,889,392 A | 3/1999 | Moore et al. |
| 5,892,933 A | 4/1999 | Voltz |
| 5,905,370 A | 5/1999 | Bryson |
| 5,917,719 A | 6/1999 | Hoffman et al. |
| 5,929,618 A | 7/1999 | Boylan et al. |
| 5,929,620 A | 7/1999 | Dobkin et al. |
| 5,935,252 A | 8/1999 | Berglund et al. |
| 5,943,227 A | 8/1999 | Bryson et al. |
| 5,946,495 A | 8/1999 | Scholhamer et al. |
| 5,990,669 A | 11/1999 | Brown |
| 5,994,885 A | 11/1999 | Wilcox et al. |
| 6,021,059 A | 2/2000 | Kennedy |
| 6,055,163 A | 4/2000 | Wagner et al. |
| 6,057,607 A | 5/2000 | Rader, III et al. |
| 6,079,026 A | 6/2000 | Berglund et al. |
| 6,100,676 A | 8/2000 | Burstein et al. |
| 6,115,441 A | 9/2000 | Douglass et al. |
| 6,121,760 A | 9/2000 | Marshall et al. |
| 6,150,803 A | 11/2000 | Varga |
| 6,157,093 A | 12/2000 | Giannopoulos et al. |
| 6,157,182 A | 12/2000 | Tanaka et al. |
| 6,163,143 A | 12/2000 | Shimamori |
| 6,163,178 A | 12/2000 | Stark et al. |
| 6,177,787 B1 | 1/2001 | Hobrecht |
| 6,181,029 B1 | 1/2001 | Berglund et al. |
| 6,191,566 B1 | 2/2001 | Petricek et al. |
| 6,194,883 B1 | 2/2001 | Shimamori |
| 6,198,261 B1 | 3/2001 | Schultz et al. |
| 6,199,130 B1 | 3/2001 | Berglund et al. |
| 6,208,127 B1 | 3/2001 | Doluca |
| 6,211,579 B1 | 4/2001 | Blair |
| 6,246,219 B1 | 6/2001 | Lynch et al. |
| 6,249,111 B1 | 6/2001 | Nguyen |
| 6,262,900 B1 | 7/2001 | Suntio |
| 6,288,595 B1 | 9/2001 | Hirakata et al. |
| 6,291,975 B1 | 9/2001 | Snodgrass |
| 6,304,066 B1 | 10/2001 | Wilcox et al. |
| 6,304,823 B1 | 10/2001 | Smit et al. |
| 6,320,768 B1 | 11/2001 | Pham et al. |
| 6,351,108 B1 | 2/2002 | Burnstein et al. |
| 6,355,990 B1 | 3/2002 | Mitchell |
| 6,385,024 B1 | 5/2002 | Olson |
| 6,392,577 B1 | 5/2002 | Swanson et al. |
| 6,396,169 B1 | 5/2002 | Voegli et al. |
| 6,396,250 B1 | 5/2002 | Bridge |
| 6,400,127 B1 | 6/2002 | Giannopoulos |
| 6,411,072 B1 | 6/2002 | Feldman |
| 6,421,259 B1 | 7/2002 | Brooks et al. |
| 6,429,630 B2 | 8/2002 | Pohlman et al. |
| 6,448,745 B1 | 9/2002 | Killat |
| 6,456,044 B1 | 9/2002 | Darmawaskita |
| 6,465,909 B1 | 10/2002 | Soo et al. |
| 6,465,993 B1 | 10/2002 | Clarkin et al. |
| 6,469,478 B1 | 10/2002 | Curtin |
| 6,469,484 B2 | 10/2002 | L'Hermite, et al. |
| 6,476,589 B2 | 11/2002 | Umminger et al. |
| 6,556,158 B2 | 4/2003 | Steensgaard-Madsen |
| 6,563,294 B2 | 5/2003 | Duffy et al. |
| 6,583,608 B2 | 6/2003 | Zafarana et al. |
| 6,590,369 B2 | 7/2003 | Burstein et al. |
| 6,608,402 B2 | 8/2003 | Soo et al. |
| 6,621,259 B2 | 9/2003 | Jones et al. |
| 6,683,494 B2 | 1/2004 | Stanley |
| 6,686,831 B2 | 2/2004 | Cook |
| 6,693,811 B1 | 2/2004 | Bowman et al. |
| 6,717,389 B1 | 4/2004 | Johnson |
| 6,731,023 B2 | 5/2004 | Rothleitner et al. |
| 6,744,243 B2 | 6/2004 | Daniels et al. |
| 6,771,052 B2 | 8/2004 | Ostojic |
| 6,778,414 B2 | 8/2004 | Chang et al. |
| 6,788,033 B2 | 9/2004 | Vinciarelli |
| 6,788,035 B2 | 9/2004 | Bassett et al. |
| 6,791,302 B2 | 9/2004 | Tang et al. |
| 6,791,368 B2 | 9/2004 | Tzeng et al. |
| 6,795,009 B2 | 9/2004 | Duffy et al. |
| 6,801,027 B2 | 10/2004 | Hann et al. |
| 6,807,070 B2 | 10/2004 | Ribarich |
| 6,816,758 B2 | 11/2004 | Maxwell, Jr. et al. |
| 6,819,537 B2 | 11/2004 | Pohlman et al. |
| 6,828,765 B1 | 12/2004 | Schultz et al. |
| 6,829,547 B2 | 12/2004 | Law et al. |
| 6,833,691 B2 | 12/2004 | Chapuis |
| 6,850,426 B2 | 2/2005 | Kojori et al. |
| 6,853,169 B2 | 2/2005 | Burstein et al. |
| 6,888,339 B1 | 5/2005 | Travaglini et al. |
| 6,903,949 B2 | 6/2005 | Ribarich |
| 6,911,808 B1 | 6/2005 | Shimamori |
| 6,915,440 B2 | 7/2005 | Berglund et al. |
| 6,917,186 B2 | 7/2005 | Klippel et al. |
| 6,928,560 B1 | 8/2005 | Fell, III et al. |
| 6,933,709 B2 | 8/2005 | Chapuis |
| 6,933,711 B2 | 8/2005 | Sutardja et al. |
| 6,947,273 B2 | 9/2005 | Bassett et al. |
| 6,963,190 B2 | 11/2005 | Asanuma et al. |
| 6,965,220 B2 | 11/2005 | Kernahan et al. |
| 6,965,502 B2 | 11/2005 | Duffy et al. |
| 6,975,494 B2 | 12/2005 | Tang et al. |
| 6,977,492 B2 | 12/2005 | Sutardja et al. |
| 7,007,176 B2 | 2/2006 | Goodfellow et al. |
| 7,023,672 B2 | 4/2006 | Goodfellow et al. |
| 2001/0033152 A1 | 10/2001 | Pohlman et al. |
| 2001/0052862 A1 | 12/2001 | Roelofs |
| 2002/0070718 A1 | 6/2002 | Rose |
| 2002/0073347 A1 | 6/2002 | Zafarana et al. |
| 2002/0105227 A1 | 8/2002 | Nerone et al. |
| 2003/0122429 A1 | 7/2003 | Zhang et al. |
| 2003/0142513 A1 | 7/2003 | Vinciarelli |
| 2003/0201761 A1 | 10/2003 | Harris |

| | | | |
|---|---|---|---|
| 2004/0027101 | A1 | 2/2004 | Vinciarelli |
| 2004/0090219 | A1 | 5/2004 | Chapuis |
| 2004/0093533 | A1 | 5/2004 | Chapuis et al. |
| 2004/0123164 | A1 | 6/2004 | Chapuis et al. |
| 2004/0123167 | A1 | 6/2004 | Chapuis |
| 2004/0135560 | A1 | 7/2004 | Kernahan et al. |
| 2004/0155640 | A1 | 8/2004 | Sutardja et al. |
| 2004/0174147 | A1 | 9/2004 | Vinciarelli |
| 2004/0178780 | A1 | 9/2004 | Chapuis |
| 2004/0189271 | A1 | 9/2004 | Hansson et al. |
| 2004/0225811 | A1 | 11/2004 | Fosler |
| 2004/0246754 | A1 | 12/2004 | Chapuis |
| 2005/0093594 | A1 | 5/2005 | Kim et al. |
| 2006/0022656 | A1 | 2/2006 | Leung et al. |

FOREIGN PATENT DOCUMENTS

| | | |
|---|---|---|
| WO | WO93/19415 | 9/1993 |
| WO | WO 01/22585 A1 | 3/2001 |
| WO | WO02/31943 | 4/2002 |
| WO | WO02/31951 | 4/2002 |
| WO | WO 02/31951 A2 | 4/2002 |
| WO | WO02/50690 | 6/2002 |

OTHER PUBLICATIONS

"Digitally-Controlled SMPS Extends Power System Capabilities" by Ron Vinsant, John DiFiore, and Richard Clarke PCIM, Jun. 1994, pgs. 30-37.
"Operating and Service Manual", SBC488A Magna-Power Electronics, Inc., Dec. 19, 2002, 58 pgs.
"Operating and Service Manual", SQ Series, DC Power Supplies Magna-Power Electronics, Inc., Dec. 16, 2002, 48 pgs.
"Uniform Language for Accessing Power Plants—Human-Machine Language", ANSI TI.317-1993 American National Standards Institute, Dec. 14, 1993, 55 pages.
"An Intelligent, Fault Tolerant, High Power, Distributed Power System for Massively Parallel Processing Computers" by J. Burns, J. Riel and T. DiBene IEEE, May 1994, 0-7803-1456-5/94, pp. 795-800.
"BE510 / BE510S Modules"—Bipolar DC Source from 100mV to 20V and from 100nA to 4A Innovative Test Systems; BE510 Version II, Issue 9, Nov. 12, 2000, 3 pgs.
"BE52x Modules"—Multi-range bipolar DC sources from 30V to 500V, 90W Innovative Test Systems; BE52x Version A, Issue 9, Aug. 3, 2001, 3 pages.
"PCX-150A 150 Amp Pulsed Current Source Operation Manual", Version 3.0 Directed Energy, Inc., Document No. 9100-0212 R4, 31 pages.
"New Applications Demand Programmable Power Supplies/Sources" by Paul O'Shea http://www.evaluationengineering.com/archive/articles/0997powr.htm, Nelson Publishing, Inc., 1997, 8 pages.
"Market Trends Toward Enhanced Control of Electronic Power Systems" by F.M. Miles, R.K. Danak, T.G. Wilson and G.G. Suranyi IEEE, 1993, 0-7803-0982-0/93, pp. 92-98.
"R Option, S Option DC Power Supplies", IEEE 488.2/RS-232 Programming Manual Power Ten, Document No. M550013-01 Rev C, Jun. 25, 2002, 56 pages.
"A Digitally Controlled Zero-Voltage-Switched Fullbridge Converter" by Karl-Heinz Rinne, Klaus Theml, Joseph Duigan and Oliver McCarthy Power Conversion, Jun. 1994 Proceedings, pp. 317-324.
"Vol. 1: Syntax and Style" Standard Commands for Programmable Instruments (SCPI) Consortium, May 1997, Version 1997.0, 68 pages.
"Integrate Internet Solutions Into Your Energy Management Network" by Johan Sarkinen and Ola Lundin Jun. 1998, 7 pages.
"Automating the Design of a Generic Modular Power System for the Global Market" by George Pedersen, Steve Briggs, and Paul Massey Advance Power Raynham Road, Bishops Stortford, Herts.; CM23 5PF UK.
"An Operation and Maintenance Process Model for Energy Management" by Ola Lundin Ericsson Components AB, Energy Systems Division, S-164 81 KISTA—Stockholm, Sweden; 7 pages.
"Intelligent Platform Management Interface Specification v1.5" Intel, Hewlett-Packard, NEC, Dell, Document Revision 1.1, Feb. 20, 2002, 459 pages.
"vol. 2: Command Reference" SCPI Consortium, May 1997, Version 1997.0, 506 pages.
"vol. 4: Instrument Classes" SCPI Consortium, May 1997, Version 1997.0, 58 pages.
"vol. 1: Syntax and Style" SCPI Consortium, May 1999, Version 1999.0, 67 pages.
"vol. 3: Data Interchange Format" SCPI Consortium, May 1997, Version 1997.0, 73 pages.
"vol. 3: Data Interchange Format" SCPI Consortium, May 1999, Version 1999.0, 72 pages.
"vol. 4: Instrument Classes" SCPI Consortium, May 1999, Version 1999.0, 115 pages.
"Service Guide for Agilent 6610xA Power Modules" Agilent Technolgies, Agilent Part No. 5959-3364, Dec. 2002, 101 pages.
"DHP Series DC Power Supplies", IEEE 488.2/RS-232 Options Programming Manual Sorensen, Division of Elgar Electronics Corporation, Document No. M550005-01 Rev B, Jul. 29, 2002, 32 pages.
"Distributed Power Hot Swap Controller" SMH4804 Summit Microelectronics, Inc., 2050 2.3, Mar. 19, 2001, 32 pages.
"Programmer Manual", PS2520G & PS2521G Programmable Power Supplies Tektronix, 070-9197-00, 1995, 70 pages.
"User Manual", PS2520, PS2520G, PS2521 & PS2521G Programmable Power Supplies Tektronix, 070-9196-00, 1995, 56 pages.
"A Power LAN for Telecommunication Power Supply Equipment" by Nicholas Vun C.H., Lau C.T. and Lee B.S. IEEE TENCON '93 Beijing, pp. 24-27.
"VXI Bus Programmable DC Power Supplies" Advanced Power Designs, Inc., Irvine, CA; 4 pages.
"Operating Manual for Internal RS-232 Interface for XT 60 Watt and HPD 300 Watt Series Programmable DC Power Supplies" Xantrex Technology, Inc., 59 pages.
"Auto Sequence Programming Examples for GPIB-M" Xantrex Technology, Inc., Nov. 27, 2002, 1.0a, 4 pages.
"SCPI Programming Examples for GPIB-M" Xantrex Technology, Inc., Nov. 26, 2002, 1.0, 3 pages.
"Implementing a Nationwide Energy Management System" by Stig Sjöberg, Tommy Hedberg, Lars Selberg and Rober Wikström.
"IEEE Standard Codes, Formats, Protocols, and Common Commands for User with IEEE Std 488.1-1987, IEEE Standard Digital Interface for Programmable Instrumentation", IEEE Std 488.2-1992 IEEE, Jun. 18, 1992, ISBN 1-55937-238-9, 254 pages.
"Agilent E3640A—E3649A Programmable dc Power Supplies" Data Sheet Agilent Technologies, 4 pages.
"Agilent E364xA Single Output DC Power Supplies" User's Guide Agilent Technologies, Part No. E3640-90001, Jan. 2000, 207 pages.
"Optimizing Power Product Usage to Speed Design Validation Testing" Application Note 1434 Agilent Technologies, Nov. 22, 2002, 16 pages.
"vol. 2: Command Reference" SCPI Consortium, May 1999, Version 1999.0, 565 pages.
"Why have Monitoring?" by P. Shawyer, P. Hobbs and A. McLeod Texcel Technology PLC, United Kingdom.
"IMPI Intelligent Platform Management Bus Communications Protocol Specification v1.0" Intel, Hewlett-Packard, NEC, Dell, Document Revision 1.0, Nov. 15, 1999, 39 pages.
"Operating and Service Manual", MQ Series DC Power Supplies Magna-Power Electronics, Inc., Dec. 19, 2002, 48 pages.
"User's Guide" Series 661xxA MPS Power Modules & Model 66001A MPS Keyboard Agilent Technologies, Agilent Part No. 5959-3386, Apr. 2000, 53 pages.
"Programming Guide" Series 661xxA MPS Power Modules Agilent Technologies, Agilent Part No. 5959-3362, Sep. 1997, 114 pages.
"Accelerator-Control-System Interface for Intelligent Power Supplies" by S. Cohen Los Alamos National Laboratory, pp. 183-186.

"Testing Intelligent Power Supplies for the Los Alamos National Laboratory Accelerator Complex" by J.C. Sturrock, S. Cohen, B.L. Weintraub, D.J. Hayden and S.F. Archuletta Los Alamos National Laboratory, pp. 217-219.

"Intelligent Power Supply Controller" by R.S. Rumrill and D.J. Reinagel IEEE, Aug. 1991, 0-7803-0135-8/91, PAC 1991, pp. 1537-1539.

"Magnet Power Supply as a Network Object" by S. Cohen and R. Stuewe IEEE, Aug. 1991, 0-7803-0135-8/91, PAC 1991, pp. 929-931.

"Non-Impact Printer Power and Motor Control System on a Chip" by James Masson and Steven Barrow IEEE, Apr. 1995, IEEE Catalogue No. 95TH8025, 0-7803-2423-4/95, pp. 98-103.

"Power Distribution Systems for Future Homes" by Po-Wa Lee, Yim-Shu Lee and Bo-Tao Lin IEEE, Aug. 1999, 0-7803-5769-88/99, pp. 1140-1146.

"Installation Guide" MPS Mainframe Model 66000A Agilent Technologies, Agilent Part No. 66000-90001, Apr. 2000, 26 pages.

"Power System Controller in an Intelligent Telecom Rectifier Plant" by Ueli Roth IEEE, Aug. 1992, 0-7803-0779-8/92, pp. 476-483.

"The Continuing Evolution of Intelligence for Telecommunications Power Plants" by Jimmy Godby IEEE, Apr. 1996, 0-7803-3507-4/96, pp. 70-75.

"Digitally Controlled Power Systems: How Much Intelligence is Needed and Where it Should be" by Tom Lock RELTEC Corporation, 5 pages.

"Controlling and Alarming DC Power Plants via the INTERNET" by Anthony P. Cosentino, Michael C. Sullivan, Richard V. Baxter, Jr. and Jon Loeck Power Conversion Products, LLC and Pensar Corporation, 6 pages.

"Defendant's Artesyn Technologies, Inc.'s Preliminary Invalidity Contentions"—(*Power-One, Inc.* vs. *Artesyn Technologies, Inc. et al.*) Civil Action No. 2-05-CV-463 (LED), United States District Court for the Eastern District of Texas; Apr. 26, 2006.

"Synchronization of Multiple Voltage Regulator Outputs," by M.W. Mueller et al. IBM Technical Disclosure Bulletin, Jun. 1999; (2 pages).

"Power System Controller in an Intelligent Telecom Rectifier Plant," by U. Roth. INTELLEC 1992, pp. 476-483.

Integrity-One: Installation, Operation and Maintenance Manual Power-One, Inc., 1999-2003 Version 1.2 (P025374-P025559).

Data Sheet, Integrity-One Power System—Rack System Power-One, Inc. (P025580-P025583).

Data Sheet, "PCS Controller" Power-One, Inc. (P025584-P025585).

Data Sheet, "PMP 25 Rectifier Module" Power-One, Inc. (P025602-P025603).

"Presenting DALI" AG DALI, 2003, pp. 1-17.

"DALI Manual" DALI AG, Digital Addressable Ligting Interface Activity Group, ZVEI-Division Luminaires, 2001,pp. 1-62.

"Microchip PIC16C781/782 Data Sheet, 8-bit CMOS Microcontrollers with A/D, D/A OPAMP, Comparators and PSMC" Microchip Technology, Inc., 2001, pp. 1-184.

"Microchip AN811, The RS-232/DALI Bridge Interface" Microchip Technology Inc., 2002, DS00811A, pp. 1-8.

"Microchip AN809, Digitally Addressable DALI Dimming Ballast" Microchip Technology, Inc., 2002, DS00809B, pp. 1-18.

"The Digital Addressable Lighting Interface (DALI): An Emerging Energy-Conserving Lighting Solution" by Ronat, Odile International Rectifier, Apr. 9, 2002, TP4/9/2002, pp. 1-6.

"Microchip AN703, Using the MCP320X 12-Bit Serial A/D Converter with Microchip PICmicro® Devices" Microchip Technology, Inc., 2002, DS00703A, pp. 1-25.

"System Management Bus (SMBus) Specification" Version 2.0 Duracall, Inc., Energizer Power Systems, Inc., Fujitsu Ltd., Intel Corporation, Linear Technology, Inc., Maxim Integrated Products, Mitsubishi Electric Semiconductor Company, PowerSmart, Inc., Toshiba Battery Co. Ltd., Unitrode Corporation, USAR Systems, Inc., Aug. 3, 2000, pp. 1-59.

"Fieldbus System Engineering Guidelines" Fieldbus Foundation, 2003-2004, pp. 1-94.

"Technical Overview, FOUNDATION™ fieldbus, Freedom to Choose. Power to Integrate." Fieldbus Foundation, 2003, FD-043 Rev 3.0, pp. 1-37.

"Silicon Labs Preliminary Invalidity Contentions" Civil Action No. 2-05-CV-463 (LED)—May 26, 2006 (U.S. District Court Eastern District of Texas).

"Memorandum Opinion and Order" *Power-One, Inc.* vs. *Artesyn Technologies, Inc.* Civil Action No. 2:05cv263—Mar. 22, 2007; (Eastern District of Texas Marshall Division).

33702 Microprocessor Power Supply (3.0A) Analog Products MC33702 Fact Sheet; Motorola/ Digital dna/ Power Management Switching; pp. 1-4.

"Electronic Products" Power Supply Special The Engineer's Magazine of Product Technology, A Hearst Business Publication, vol. 37, No. 10, Mar. 1995, 4 pages.

"KEKB Power Supply Interface Controller Module" by A. Akiyama, T. Nakamura, M. Yoshida, T. Kubo, N. Yamamoto and T. Katoh. KEK, High Energy Accelerator Research Organization, 1-1 Ohio, Tsukuba 305, Japan International Conference on Accelerator and Large Experimental Physics and Control Systems, 1997, Beijing, China, 4 pages.

"Magnet Power Supply Control System in KEKB Accelerators" by T.T. Nakamura, A. Akiyama, T. Katoh, Ta. Kubo, N. Yamamoto, M. Yoshida. KEK, Tsukuba, Japan International Conference on Accelerator and Large Experimental Physics Control Systems, 1999, Trieste, Italy, pp. 406-408.

"Motorola Switch Mode Power Supply With Multiple Linear Regulators And High Speed CAN Transceiver" Motorola, Inc. 2002; digital dna; Analog Marketing; Rev. 2.5, Nov. 2002; 33394; Multi-Output Power Supply Semiconductor Technical Data.

"Power Management Solutions For Networking Applications"; Presented by Luc Darmon Smart Networks Developer Forum 2003—Jun. 4-6 Euro-Disney Paris, France; Motorola digital dna; www.motorola.com/sndf; pp. 1-26.

Preliminary Information 1.5 A Switch-Mode Power Supply With Linear Regulator 33701; Power Supply Integrated Circuit; Motorola Semiconductor Technical Data; Analog Marketing MC33701/D Rev. 1.0, May, 2003; Motorola digital dna; pp. 1-24.

"Quantization Resolution and Limit Cycling in Digitally Controlled PWM Converters" by Angel V. Peterchev and A.V. Sanders Electrical Engineering and Computer Science; US Berkley; Power Electronics Specialists Conference, 2001.PESC, vol. 2, Jun. 17-21, 2001, pp. 465-471; XP002274573.

"System Management Bus Specification" Smart Battery System Specifications, Revision 1.1, Dec. 11, 1998 Copyright 1996, 1997, 1998, Benchmarq Microelectronics Inc., Duracell Inc., Energizer Power Systems, Intel Corporation, Linear Technology Corporation, Maxim Integrated Products, Mitsubishi Electric Corporation, National Semiconductor Corporation, Toshiba Battery Co., Varta Batterie AG, All rights reserved, 39 pages.

"The I2C-Bus Specification" Version 2.1 Jan. 2000 Document Order No. 9398 393 40011, pp. 1-46.

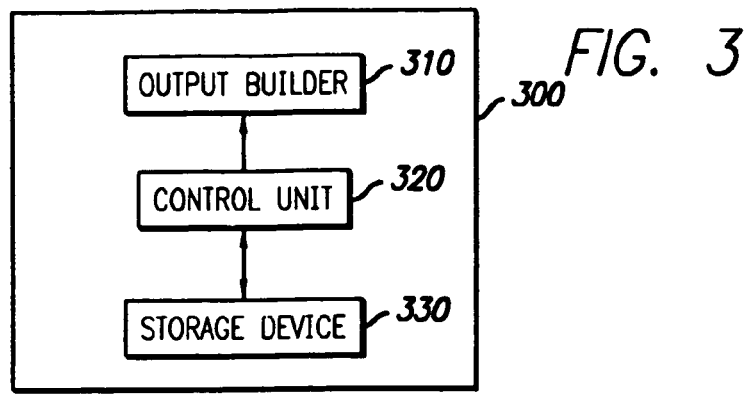
FIG. 3
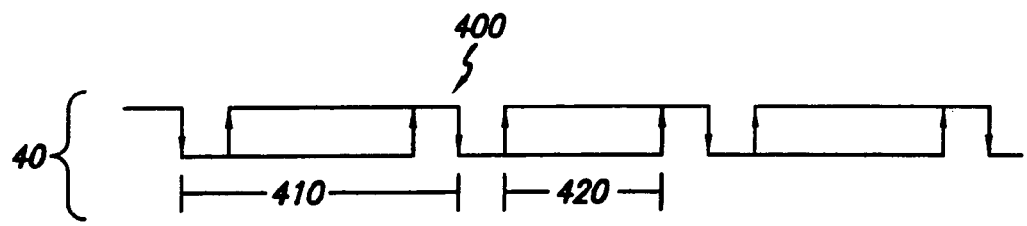
FIG. 4
FIG. 5
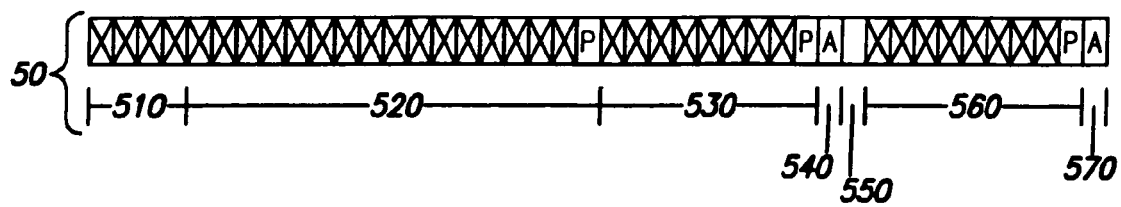

SYSTEM AND METHOD FOR CONTROLLING OUTPUT-TIMING PARAMETERS OF POWER CONVERTERS

RELATED APPLICATION DATA

This patent application is a continuation of U.S. patent application Ser. No. 11/103,835, filed Apr. 11, 2005, now issued as U.S. Pat. No. 7,068,021 on Jun. 27, 2006, which was a continuation of U.S. patent application Ser. No. 10/388,831, filed Mar. 14, 2003, now issued as U.S. Pat. No. 6,936,999 on Aug. 30, 2005.

BACKGROUND OF THE INVENTION

1. Field of the Invention

The present invention relates to controlling a point-of-load ("POL") regulator output, or more particularly, to a, system and method of utilizing output-timing data to control at least one output timing parameter of a POL regulator.

2. Description of Related Art

Point-of-load ("POL") regulators, which are also referred to as voltage regulators or DC/DC converters, are commonly used in conjunction with electronic circuits. This is because the voltage/current requirements of electronic circuits typically differ from the voltage that is readily available or the current that can practically be delivered. For example, some electronic devices only include a single voltage input (e.g., 12v), but require different voltages for circuits contained within (e.g., 3v, 5v, 9v, etc.). A common solution is to design multiple POL regulators within the device for converting the single input voltage into multiple voltage levels.

Similarly, some electronic devices include circuits that require low voltage (e.g., 1v), high current (e.g., 100 A) power supplies. This is problematic in that it is impractical to deliver high current at low voltage levels over a relatively long distance and still meet desired regulation performances. A common solution is to use a high voltage, low current power supply and design a POL regulator near the internal circuit. This allows low current to travel throughout the device, and provides a low voltage, high current power supply (i.e., using the POL regulator) near the internal circuit.

Traditionally, POL regulators operate in conjunction with at least one power supply controller. The controller (1) activates and partially programs the POL regulator by providing data directly to the POL regulator, (2) monitors the output of the POL regulator by measuring data external to the POL regulator, and (3) allows the output of the POL regulator to be transmitted to an external load circuit by controlling an external switch. Specifically, the controller provides the POL regulator with output-voltage-set-point data and enable data. The POL regulator, in response to receiving the enable data, produces an output having a voltage level in accordance with the output-voltage-set-point data. The output of the POL regulator is then measured by the controller. If the output is correct, the controller activates an external transistor switch, which allows the output to be transmitted to the external load circuit. If a particular output slew rate is required, the controller can toggle or control linearly the external transistor switch to achieve the desired slew rate. Thus, the power supply controller controls the output timing parameters of each POL regulator (e.g., sequencing, slew rate, etc.) by controlling a plurality of external transistor switches.

The drawback with such a control system is that it adds complexity, expense and size to the control system by requiring the controller to communicate with multiple devices (e.g., a POL regulator and an external transistor switch) to control the output timing parameters of a single POL regulator. Thus, it would be advantageous to have a system and method of controlling the output timing parameters of a POL regulator that overcomes these drawbacks.

SUMMARY OF THE INVENTION

The present invention provides a system and method of utilizing output-timing data to control at least one output timing parameter of a point-of-load ("POL") regulator. Embodiments of the present invention operate in accordance with a power supply controller ("controller") and at least one POL regulator. Specifically, in one embodiment of the present invention, each POL regulator includes an output builder, a control unit and a storage device. In this embodiment, the controller is adapted to transmit output-timing data to the regulator via a bus, or more particularly to the control unit (e.g., microprocessor, etc.) located within the POL regulator. The output-timing data is then stored in the storage device and used by the control unit and the output builder (e.g., voltage generating device, etc.) to produce an output.

Specifically, POL regulators are traditionally adapted to receive voltage set-point data and produce an output having a voltage level in accordance with the voltage set-point data. In a preferred embodiment of the present invention, the POL regulator is further adapted to receive output-timing data and utilize the output-timing data to determine at least one output timing parameter. Examples of output timing parameters include when to generate the output (e.g., sequencing data, turn-on data), when to stop generating the output (e.g., termination data, turn-off data), the slew rate of the output (e.g., slew-rate data), etc. For example, a POL regulator operating in accordance with one embodiment of the present invention may utilize the output-timing data, or a portion thereof (e.g., slew-rate data), to generate an output having a particular slew rate. Similarly, a POL regulator operating in accordance with one embodiment of the present invention may utilize the output-timing data, or a portion thereof (e.g., sequencing data, turn-on data), to determine (or calculate) a period of time to wait (e.g., delay period) before the output is generated. In other words, at least a portion of the output-timing data can be used to generate a series of outputs in a particular order, or sequence. For example, a first POL regulator may produce a one volt output ten milliseconds after an event has occurred (e.g., activation data has been received, etc.), a second POL regulator may produce a five volt output two milliseconds after the event has occurred, etc.

A more complete understanding of the system and method of utilizing output-timing data to control at least one output timing parameter of a POL regulator will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 3 depicts a POL regulator operating in accordance with one embodiment of the present invention.

FIG. 4 illustrates one method of communicating with a POL regulator over a serial bus.

FIG. 5 illustrates one communication cycle that may be transmitted to/from a POL regulator.

DETAILED DESCRIPTION OF THE PREFERRED EMBODIMENT

The present invention provides a system and method of utilizing output-timing data to control at least one output timing parameter of a POL regulator. In the detailed description that follows, like element numerals are used to describe like elements illustrated in one or more figures.

Figure 1:
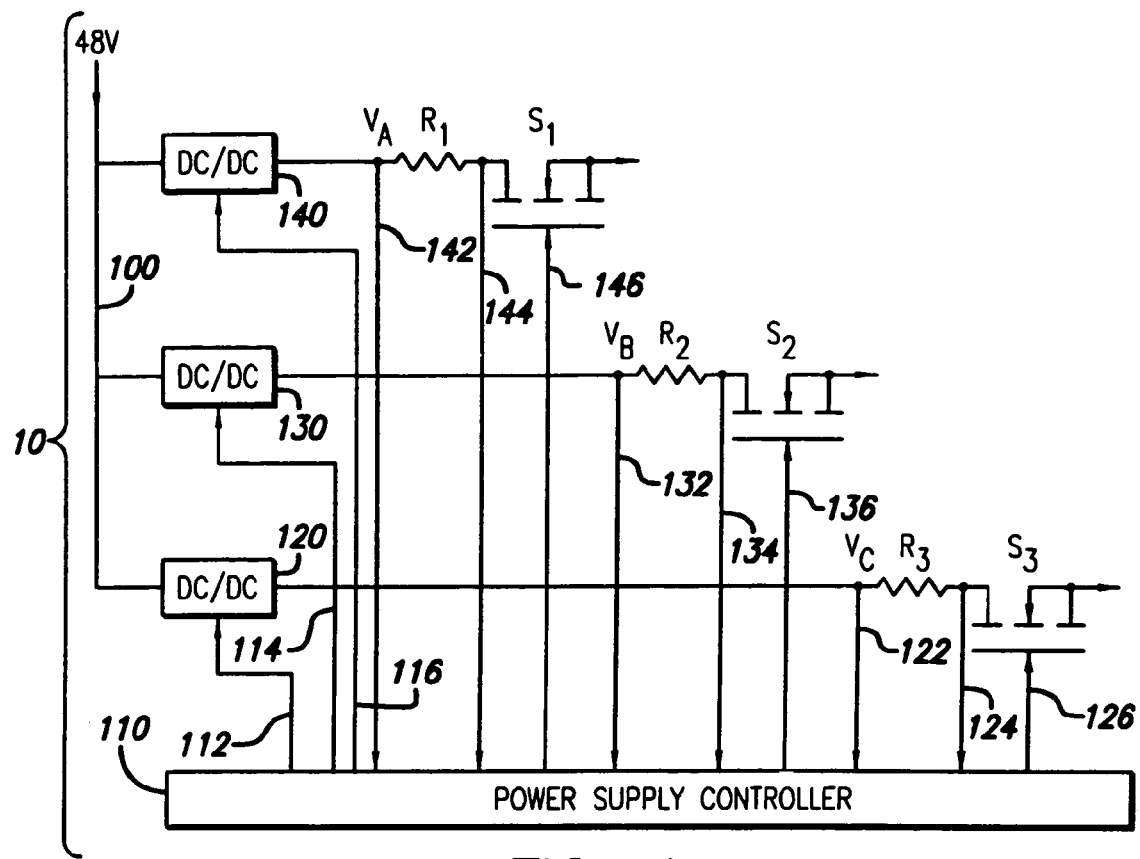
FIG. 1 depicts a prior art POL or DC/DC control system.

FIG. 1 illustrates a prior art DC/DC control system 10 where the power supply controller ("controller") 110 communicates with a plurality of DC/DC converters (i.e., 120, 130 and 140), also referred to as voltage regulators or POL regulators, via a plurality of six bit parallel buses (i.e., 112, 114 and 116), and a plurality of external circuits (e.g., R1/S1, R2/S2, R3/S3) via a plurality of three-wire output connections (i.e., 122-126, 132-136, and 142-146). More particularly, each six bit parallel bus includes an enable/disable bit and five VID code bits, and each three-wire output connection includes a voltage monitoring line (i.e., 122, 132 and 142), a current monitoring line (i.e., 124, 134 and 144), and a switch enable line (i.e., 126, 136, 146).

As shown in FIG. 1, the controller 110 controls the output voltage of each DC/DC converter by activating and partially programming the converter via the six bit parallel bus, and monitoring the converter via the three-wire output connection. For example, the controller 110 provides output-voltage-set-point data to the DC/DC converter 140 via the VID code portion of the six bit parallel bus 116. The controller 110 then activates the DC/DC converter 140 via the enable/disable portion of the six bit parallel bus 116. Once activated, and in accordance with the output-voltage-set-point data, the DC/DC converter 140 converts the voltage provided via the power supply 100 (e.g., 48v) into an output voltage $V_A$. The controller 110 then verifies that the output voltage $V_A$ is the desired voltage by measuring the voltage via the voltage monitoring line 142. If the output voltage $V_A$ is acceptable, it is provided to the load (not shown) by activating the transistor switch $S_1$ via the switch enable line 146. The controller 110 can then continuously monitor the output voltage and the output current by measuring the voltage via the voltage monitoring line 142 and measuring the voltage drop across the sense resistor $R_1$ (i.e., the voltage differential between the current monitoring line 144 and the voltage monitoring line 142), respectively. If a particular slew rate is required, the controller 110 can toggle or control linearly the transistor switch $S_1$ via the switch enable line 146 to produce the desired slew rate. The controller 110 communicates (i.e., partially programs, activates, monitors, and controls the output) with the remaining DC/DC converters 120, 130 in the same manner.

The problem with such a control system 10 is that it adds complexity, expense and size to the overall electronic device (not shown) by requiring the controller 110 to communicate with multiple devices in order to control the output of a DC/DC converter (e.g., 140). For example, in order to generate and provide an output voltage to an external load circuit, the controller must communicate with the DC/DC converter (to produce a particular output voltage) and the external transistor switch (to allow the output voltage to be provided to the external load circuit). Not only does such a system require several external circuits (e.g., external transistor switches), but it also requires additional wires (or traces) in order to communicate with the external circuits.

Figure 2:
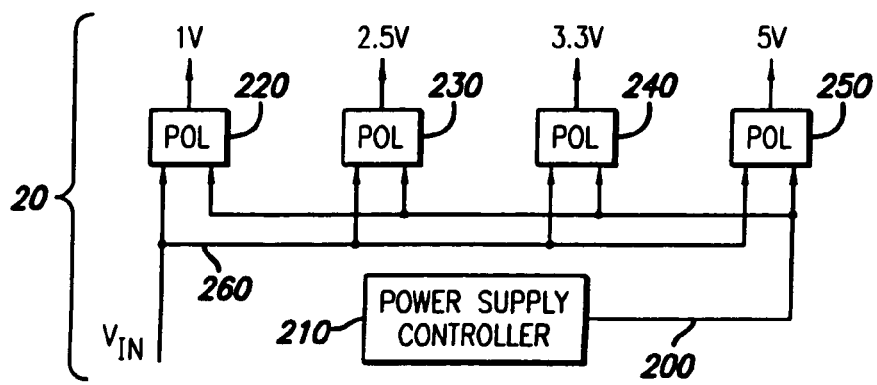
FIG. 2 depicts a POL control system operating in accordance with one embodiment of the present invention.

FIG. 2 illustrates a POL control system 20 operating in accordance with one embodiment of the present invention. Specifically, a controller 210 is used to communicate with a plurality of POL regulators (i.e., 220, 230, 240 and 250) via a bus 200. In one embodiment of the present invention, this communication includes providing voltage set-point data and enable data to each POL regulator. The data is then used by each POL regulator to convert the input voltage (i.e., $V_{IN}$) provided via the power bus 260 into an output voltage. Specifically, after each POL regulator has been activated (i.e., receives enable data), it produces an output having a voltage level in accordance with the voltage set-point data. For example, if the voltage set-point data corresponds to one volt, then the POL regulator will produce a one volt output. It should be appreciated that the POL regulators depicted herein (e.g., 220, etc) include, but are not limited to, point-of-load regulators, power-on-load regulators, DC/DC converters, voltage regulators, and all other programmable voltage or current regulating devices (including all single and multiple output devices) generally known to those skilled in the art. It should further be appreciated that the controller (e.g., 210) may exist as a stand-alone device (as depicted in FIG. 2) or integrated into another device, such as a front-end converter (not shown) or another POL regulator.

In a preferred embodiment of the present invention, the controller 210 is further adapted to identify at least one output timing parameter of a POL regulator by transmitting output-timing data to the POL regulator. For example, in response to being activated (i.e., receiving enable data), a POL regulator may generate an output having a particular slew rate in accordance with at least a portion of the output-timing data, (e.g., slew-rate data). Similarly, after being activated, a POL regulator may wait a period of time before generating an output—where the period of time either corresponds to at least a portion of the output-timing data (e.g., sequencing data) or is calculated using at least a portion of the output-timing data (e.g., turn-on data). In other words, the delay period can either be provided by the controller 210 (e.g., sequencing data) or calculated using data that has been provided by the controller 210 (e.g., turn-on data).

For example, a POL regulator might generate a one volt output five milliseconds after receiving activation data if it received voltage set-point data and sequencing data corresponding to one volt and five milliseconds, respectively. Alternatively, a POL regulator might generate a one volt output one millisecond after receiving activation data if it received voltage set-point data, slew-rate data and turn-on data corresponding to two volts, one volt per millisecond and three milliseconds, respectively. This is because it takes two milliseconds to produce a two volt output at a slew rate of one volt per millisecond. In other words, a one millisecond delay period plus a two millisecond voltage ramp-up period equals three milliseconds (e.g., turn-on data). It should be appreciated, however, that the time measurements discussed herein are not limited to measurements taken from (or even used in conjunction with) the reception of enable or activation data. Thus, time measurements taken from any known event (e.g., the reception of a particular transmission cycle or data bit, the occurrence of a particular condition, etc.) are within the spirit and scope of the present invention. It should further be appreciated that the terms generated and produced as used herein are used to indicate a point-in-time (approximately) when an output is being provided by the POL (e.g., to an external load), regardless of whether the output is at its peak voltage or ramping up to its peak voltage. Thus, an output of five volts is being generated or produced at the time it is being provided by (or delivered external to) the POL, regardless of whether the output is five volts at the time it's initially provided or ramping up to five volts. It should also be appreciated that the output timing parameters associated with the output-timing data, and therefore the output-timing data itself, are not limited to slew rate, sequencing or turn-on parameters, but further include all other output timing parameters generally known to those skilled in the art. Thus, for example, output-timing data may be used to determine when a POL regulator is to turn-off its output (e.g., termination data or turn-off data).

In one embodiment of the present invention, as shown in FIG. 3, each POL regulator 300 includes an output builder 310, a point-on-load control unit 320 ("POL control unit") and a storage device 330. It should be appreciated that the output builder 310 includes, but is not limited to, all voltage building and converting circuits generally known to those skilled, including circuits that are single and multi-staged (e.g., circuits that include a digital to analog converter, a pulse width modulation controller, an analog voltage reference circuit, etc.). It should further be appreciated that the POL control unit 320 includes, but is not limited to, application specific integrated circuits (ASICs), processors, microprocessors, programmable devices and all other computing devices generally known to those skilled in the art. It should also be appreciated that the storage device 330 can be a long term or short term storage device, including, but not limited to, registers, RAM, ROM, EPROM, EEPROM, flash memory, and all other digital data storage devices generally known to those skilled in the art.

Referring to FIG. 3, the POL control unit 320 is adapted to receive output-timing data and store the output-timing data in the storage device 330. For example, if the storage device 330 is a plurality of registers, the output-timing data may be stored in at least one output-timing register (e.g., a sequencing register, a slew-rate register, etc.). This data is then used by the control unit 320 (or to some degree the output builder 310) to generate an output. Specifically, the output builder 310 is adapted to generate an output in accordance with data received/stored by the control unit 320 (e.g., voltage set-point data, output-timing data, etc.). For example, in accordance with one embodiment of the present invention, the output builder 310 and the control unit 320 are adapted to generate an output that includes a particular slew rate, or an output that is to be produced at a particular time, etc.—depending upon the type of output-timing data received/stored. It should be appreciated that the location, type, and/or number of components illustrated in FIG. 3 are merely to exemplify the environment in which the present invention operates, and should not be considered limitations of the present invention. For example, a POL regulator including more than one output builder, having components in different locations (e.g., a storage device within the POL control unit, a storage device external to the POL regulator, etc.), or having additional (or fewer) components is within the spirit and scope of the present invention.

While the output-timing data can be transmitted via a parallel bus, one embodiment of the present invention involves transmitting the output-timing data over a bi-directional serial data bus (either synchronously or asynchronous) (see e.g., FIG. 2, bus 200). In other words, the bi-directional serial bus is either a two-wire serial data bus (e.g., I$^2$C) that allows data to be transmitted asynchronously or a single-wire serial data bus that allows data to be transmitted synchronously (i.e., synchronized to a clock signal). In another embodiment of the present invention the serial data bus (or a portion thereof is superimposed over (or coexistent with) a power bus used to deliver power from the front-end converter to the POL regulators (see e.g., FIG. 2, power bus 260).

FIG. 4 illustrates one method of communicating over a single-wire serial bus. Specifically, a transmission line 40 is created by propagating a clock signal 400 over the serial bus. The clock signal 400 can be generated by the controller, a particular POL regulator (e.g., the POL regulator with the least significant address), or an external device. The clock signal 400 synchronizes the various communicating-devices (i.e., the POL regulators and the controller) and creates a series of clock cycles 410, each one including a data bit 420. This allows the various communicating devices to transmit a single bit of data for every clock cycle 410. In other words, each communicating device transmits data by leaving/pulling the data bit 420 high or low (i.e., binary one or zero). It should be appreciated that FIG. 4, as discussed herein, is not intended to limit the present invention, but to provide an example as to how communication can occur over a single-wire serial bus.

FIG. 5 illustrates one method of transmitting information between the controller and at least one POL regulator. Specifically, a forty-two bit communication cycle 50 can be used to transmit output-timing data, voltage set-point data, and/or enable data. As shown in FIG. 5, the forty-two bit transmission cycle 50 includes a four bit start sequence 510, a sixteen bit (with parity) address set 520, an eight bit (with parity) command set 530, a first acknowledgement bit 540, an eight bit (with parity) data set 560, and a second acknowledge bit 570. An additional bit 550 has been added to ensure that the command set 540 is executed before the data set 560 is provided. It should be appreciated that the communication cycle 50 depicted in FIG. 5 is not intended to limit the present invention, but to illustrate how information can be transmitted over a serial bus. Therefore, communication cycles containing more or less information and/or bits is within the spirit and scope of the present invention.

The first and second acknowledgement bits 540, 570 are used to acknowledge the reception of the command set 530 and the data set 560, respectively. It should be appreciated that the device responsible for providing the first and second acknowledgement bits 540, 570 varies depending upon whether the information is being sent to or from the POL regulator (i.e., whether the information is being written, read, or provided).

The command set 530, data set 560, and address set 520 enable the controller and the POL regulators to write, read and provide data. Specifically, (i) the command set 530 is used to identify whether and what the controller is writing (e.g., writing to the output-timing register), the controller is reading (e.g., reading the status register), or the POL regulator is providing (e.g., providing output-timing data), (ii) the address set 520 is used to identify the POL regulator(s) that is being written to or read, or the POL regulator that is providing information, and (iii) the data set 560 is used to identify the actual data that is being written, read, or provided.

The start sequence 510 and address set 520 are used, in part, to identify the sender of the information. For example, the controller uses a different start sequence 510 than the POL regulators. Thus, the controller can determine, by reading the start sequence 510 of the communication cycle 50 being transmitted, whether a POL regulator is also attempting to send a communication cycle 50 at the same time. Similarly, each-POL regulator has a different address set 520. Thus, a POL regulator can determine, by reading the start sequence 510 and address set 520 of the communication cycle 50 being transmitted, whether another POL regulator or the controller is also attempting to send a communication cycle 50 at the same time. If multiple devices are attempting to send a communication cycle 50, bus-arbitration data is used to allocate or arbitrate bus use. It should be appreciated that the bus-arbitration data can either be stored (or hard wired) as a default value or provided by the power supply controller and stored in the POL storage device.

Figure 6:
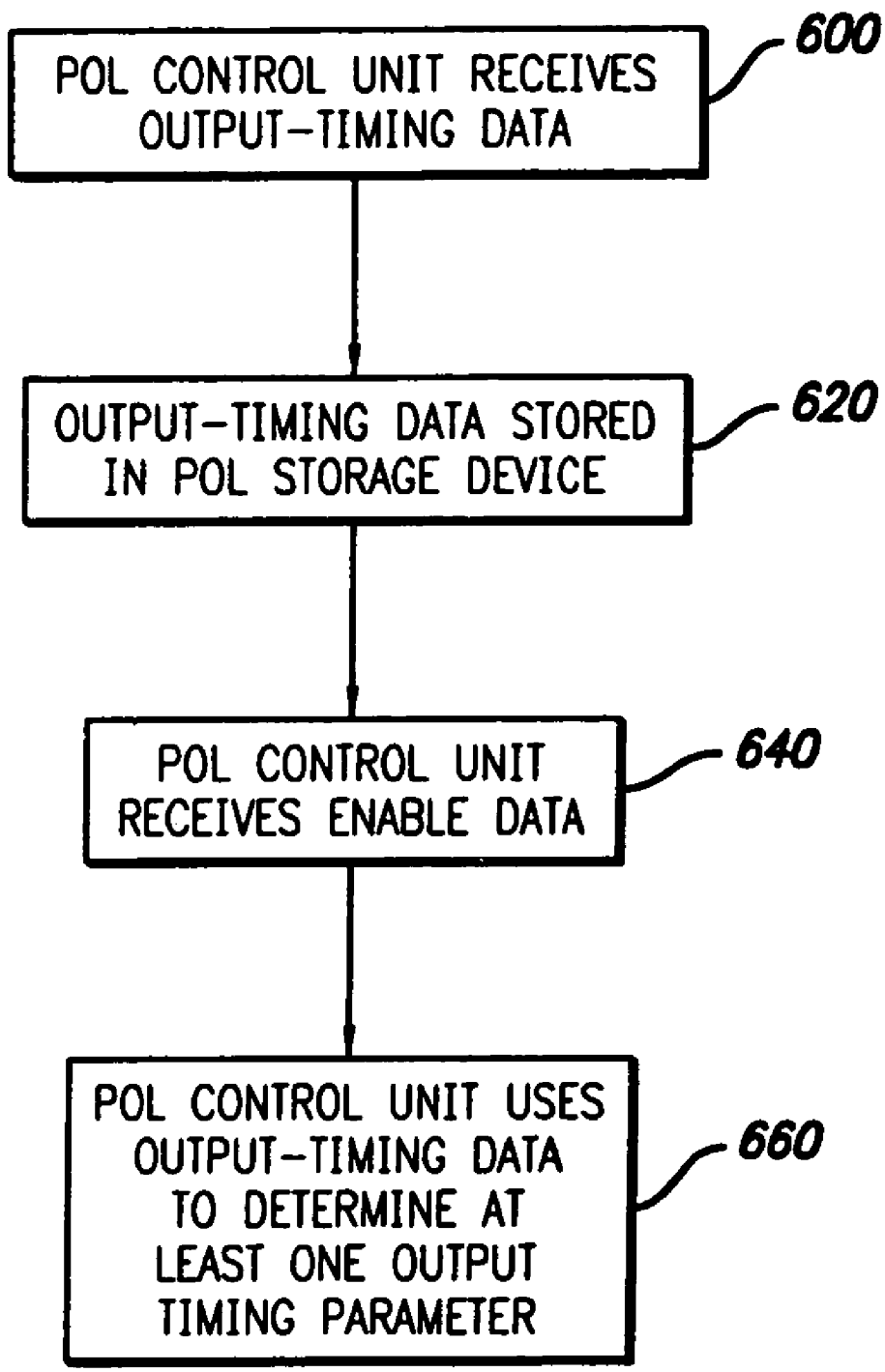
FIG. 6 is a flow chart depicting one method of utilizing output-timing data in accordance with the present invention.

One method of utilizing output-timing data to determine at least one output timing parameter is illustrated in FIG. 6. Specifically, at step 600, the POL control unit receives output-timing data, which may include slew-rate data, sequencing data, termination data, etc. The output-timing data is then stored in the POL storage device at step 620. For example, if the POL storage device is a plurality of registers, then the output-timing data (e.g., slew-rate data, sequencing data, etc.) may be stored in at least one of the plurality of registers (e.g., a slew-rate register, a sequencing register, etc.). At step 640, the POL control unit receives enable data, which activates the POL regulator for the production of an output. At step 660, the POL control unit uses the output-timing data stored in the POL storage device to determine at least one output timing parameter. It should be appreciated, however, that step 660 may be (at least in part) more applicable during certain time periods, depending on the nature of the output-timing data. For example, if the output-timing data is related to the time in which the output is to be generated or the slew rate of the output, step 660 may be more applicable to producing the output. Alternatively, if, for example, the output-timing data is related to the time in which the output is to be terminated, step 660 may be more applicable after the output has been produced.

Having thus described a preferred embodiment of a system and method of utilizing output-timing data to control at least one output timing parameter of a point-of-load regulator, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A power control system comprising:
   a controller adapted to provide output control signals;
   a least one data bus operatively connected to the controller; and
   at least one voltage regulator operatively connected to the at least one data bus and receiving the output control signals via the at least one data bus, the at least one voltage regulator including a control unit and a power conversion circuit, the control unit being adapted to control operation of the power conversion circuit responsive to the output control signals.

2. The power control system of claim 1, wherein the output control signals further comprise at least one command setting an output voltage of the power conversion circuit to a desired value.

3. The power control system of claim 1, wherein the output control signals further comprise at least one command setting a rate of change of an output voltage of the power conversion circuit to a desired value.

4. The power control system of claim 1, wherein the output control signals further comprise at least one command setting a turn-on delay of an output voltage of the power conversion circuit.

5. The power control system of claim 1, wherein the output control signals further comprise at least one command setting a turn-off delay of an output voltage of the power conversion circuit.

6. The power control system of claim 1, wherein the output control signals further comprise at least one multi-bit command message.

7. The power control system of claim 6, wherein the multi-bit command message includes at least an address of the at least one voltage regulator.

8. The power control system of claim 6, wherein the multi-bit command message includes a command portion and a data portion.

9. The power control system of claim 1, wherein the at least one voltage regulator further comprises a plurality of voltage regulators, the output control signals being directed to plural ones of the plurality of voltage regulators.

10. The power control system of claim 1, wherein the control unit further comprises a memory adapted to store the output control signals received from the controller.

11. The power control system of claim 10, wherein the control unit is further adapted to control operation of the power conversion circuit responsive to the output control signals stored in the memory.

12. The power control system of claim 10, wherein the output control signals further comprise at least one command setting an output voltage of the power conversion circuit to a desired value and having a slew rate defined by previously stored control signals.

13. The power control system of claim 1, wherein the at least one data bus further comprises a serial data bus.

14. The power control system of claim 1, wherein the at least one data bus further comprises a bi-directional serial data bus.

15. The power control system of claim 1, wherein the at least one data bus further comprises a two-wire serial data bus adapted for asynchronous data transmission.

16. The power control system of claim 1, wherein the at least one data bus further comprises a single-wire serial data bus adapted for synchronous data transmission.

17. The power control system of claim 1, wherein the at least one data bus further comprises a serial data bus adapted for data transmission synchronized to a clock signal.

18. The power control system of claim 1, wherein the at least one data bus is superimposed over a power bus.

* * * * *